US008984523B2

(12) United States Patent
Vajda

(10) Patent No.: US 8,984,523 B2
(45) Date of Patent: Mar. 17, 2015

(54) METHOD FOR EXECUTING SEQUENTIAL CODE ON THE SCALABLE PROCESSOR AT INCREASED FREQUENCY WHILE SWITCHING OFF THE NON-SCALABLE PROCESSOR CORE OF A MULTICORE CHIP

(75) Inventor: Andras Vajda, Sundsberg (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 276 days.

(21) Appl. No.: 13/321,228

(22) PCT Filed: May 26, 2009

(86) PCT No.: PCT/SE2009/050594
§ 371 (c)(1),
(2), (4) Date: Nov. 18, 2011

(87) PCT Pub. No.: WO2010/138031
PCT Pub. Date: Dec. 2, 2010

(65) Prior Publication Data
US 2012/0060170 A1    Mar. 8, 2012

(51) Int. Cl.
*G06F 9/50* (2006.01)
*G06F 9/48* (2006.01)
*G06F 1/32* (2006.01)

(52) U.S. Cl.
CPC ............ *G06F 9/4893* (2013.01); *G06F 1/3203* (2013.01); *G06F 1/3287* (2013.01); *Y02B 60/144* (2013.01); *Y02B 60/1217* (2013.01)
USPC ............ 718/104; 713/320; 713/323; 713/324

(58) Field of Classification Search
CPC ... G06F 9/4893; G06F 1/3287; G06F 1/3203; Y02B 60/144; Y02B 60/1217
USPC .................................. 718/104; 713/320, 324
See application file for complete search history.

(56) References Cited

U.S. PATENT DOCUMENTS 6,986,068 B2 *  1/2006  Togawa .......................... 713/320
7,093,147 B2 *  8/2006  Farkas et al. ................... 713/320

(Continued)

FOREIGN PATENT DOCUMENTS

WO    WO 2005010737 A2 *  2/2005
WO    WO 2007/019003 A    2/2007

OTHER PUBLICATIONS

Annavaram et al., Mitigating Amdahl's law through EPI throttling, 2005, In proceedings of international symposium on computer architecture, pp. 298-309.*

(Continued)

*Primary Examiner* — Meng An
*Assistant Examiner* — Abu Ghaffari

(57) ABSTRACT

Method and scheduler in an operating system, for scheduling processing resources on a multi-core chip. The multi-core chip comprises a plurality of processor cores. The operating system is configured to schedule processing resources to an application to be executed on the multi-core chip. The method comprises allocating a plurality of processor cores to the application. Also, the method comprises switching off another processor core allocated to the application, not executing the sequential portion of the application, when a sequential portion of the application is executing on only one processor core. In addition, the method comprises increasing the frequency of the one processor core executing the application to the second frequency, such that the processing speed is increased more than predicted by Amdahl's law.

12 Claims, 6 Drawing Sheets

(56) References Cited

U.S. PATENT DOCUMENTS

| | | | |
|---|---|---|---|
| 7,937,568 B2* | 5/2011 | Correale et al. | 712/221 |
| 2003/0088800 A1* | 5/2003 | Cai | 713/320 |
| 2005/0223249 A1* | 10/2005 | Samson | 713/320 |
| 2007/0220294 A1* | 9/2007 | Lippett | 713/320 |
| 2007/0288769 A1* | 12/2007 | Chang et al. | 713/300 |
| 2008/0005592 A1 | 1/2008 | Allarey et al. | |

OTHER PUBLICATIONS

Kumar et al., Hetrogeneous Chip Multiprocessors, 2005, IEEE, pp. 32-38.*

Kumar, R., et al; "A multi-core approach to addressing the energy-complexity problem in microprocessors," In Workshop On Complexity-Effective Design, Jun. 2003.

* cited by examiner

METHOD FOR EXECUTING SEQUENTIAL CODE ON THE SCALABLE PROCESSOR AT INCREASED FREQUENCY WHILE SWITCHING OFF THE NON-SCALABLE PROCESSOR CORE OF A MULTICORE CHIP

TECHNICAL FIELD

The present invention relates to a method and a scheduler in an operating system and, more in particular, to a mechanism for scheduling processing resources on a multi-core chip.

BACKGROUND

The computing industry's development over the last decades has been largely defined by a dramatic increase of the available computing power, driven primarily by the self-fulfilment of Moore's law. However, recently this development has been heavily impacted by the inability of scaling performance further through increased frequency and complexity of processor devices, due primarily to power and cooling issues; as an answer, the industry turned to Chip-MultiProcessors (CMP) or multi-core devices. It is predicted that the advancement of manufacturing technology, in fact, the continued development according to Moore's law, will allow for chips comprising 100s or even 1000s of processor cores.

Currently operating system schedulers work on the principle of assigning tasks to available hardware resources such as processor cores or hardware threads and sharing a core among multiple applications.

Current approaches have a number of limitations. They do not scale well to high number of cores within the same chip. Micro-managing each core does not pay off well and may not be economical for simple cores. Further, current solutions do not consider dynamic variations in the processing requirements of applications. An application may be at different point in time executing in single threaded mode, while at other moments may require multiple threads of execution.

Chip multiprocessors pose however new requirements on operating systems and applications. It appears that current symmetric multi-processing, time-shared operating systems will not scale to several tens, less to hundreds or thousands of processor cores. On the application side, Amdahl's law, even it's version for chip multi-processors, will put a limit to the amount of performance increase that can be achieved even for highly parallelized applications, assuming static symmetric or static asymmetric multi-core chips as illustrated in FIG. 1. For example, an application with only 1% sequential code can achieve, according to Amdahl's law, a theoretical speed-up factor of 7.4 on 8 cores, 14 on 16 cores, but only 72 on 256 cores and 91 on 1024 cores, compared with running on a single core.

Amdahl's law for CMP is expressed as:

$$Speedup_{dynamic}(f, n, r) = \frac{1}{\frac{1-f}{perf(r)} + \frac{f}{n}}$$

Where f is the fraction of the code that can execute in parallel, n is the number of processor cores, r is the number of processor cores that can be used jointly to execute sequential portions and perf(r) is the resulting performance, assumed to be less than r.

Better scalability, approaching linear for highly parallelized applications, could theoretically be obtained with chips where computing resources could be utilized either as several cores executing in parallel, for the execution of the parallel sections of the applications; or as a single, fast, powerful core for running the single-threaded, sequential portions of the applications. However, so far there is no solution that would scale with the number of cores.

Thus there is a problem to increase the processing speed of application code in a computer.

SUMMARY

It is the object to obviate at least some of the above disadvantages and provide an improved performance of applications executing on a multi-core system.

According to a first aspect, the object is achieved by a method in an operating system for scheduling processing resources on a multi-core chip. The multi-core chip comprises a plurality of processor cores. The operating system is configured to schedule processing resources to an application to be executed on the multi-core chip. The method comprises allocating a plurality of processor cores to the application. Also, the method comprises switching off processor cores allocated to the application, not executing the sequential portion of the application, when a sequential portion of the application is executing on only one processor core. In addition, the method comprises increasing the frequency of the one processor core executing the application, such that the processing speed is increased more than predicted by Amdahl's law.

According to a second aspect, the object is also achieved by a scheduler in an operating system for scheduling processing resources on a multi-core chip. The processing resources are allocated to an application to be executed on the multi-core chip. The multi-core chip comprises a plurality of processor cores. The scheduler comprises an allocation unit. The allocation unit is adapted to allocate a plurality of processor cores to the application. Also, the scheduler comprises a switching unit. The switching unit is adapted to switch off a processor core, allocated to the application, not executing a sequential portion of the application. Further, the scheduler comprises an increasing unit. The increasing unit is adapted to increase the frequency of the one processor core executing the application, such that the processing speed is increased more than predicted by Amdahl's law.

The present solution is based on a space shared approach for scheduling multiple processes on a many core chip. Also, the present solution rely on adapting performance of individual cores and the chip as a whole by controlled and scheduled variation of the frequency at which different cores execute, in contrast with current thread migration strategies. Instead of trying to guess the best thread assignment policy in the operating system rely on application generated requests for computing resources, similarly to how memory is currently managed. Thereby is a near-linear scaling of speed with the number of processing cores achieved. Further, the present solution addresses the issue of dynamically adapting processing needs to the requirements of applications. In addition, as the present solution is not relying on thread migration, hence improving cache usage characteristics. Thereby is an improved performance within a wireless communication system achieved.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and a scheduler in an operating system, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present method and/or scheduler to any of the particular forms disclosed, but on the contrary, the present methods and schedulers are to cover all modifications, equivalents, and alternatives falling within the scope of the invention as defined by the claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Figure 1:
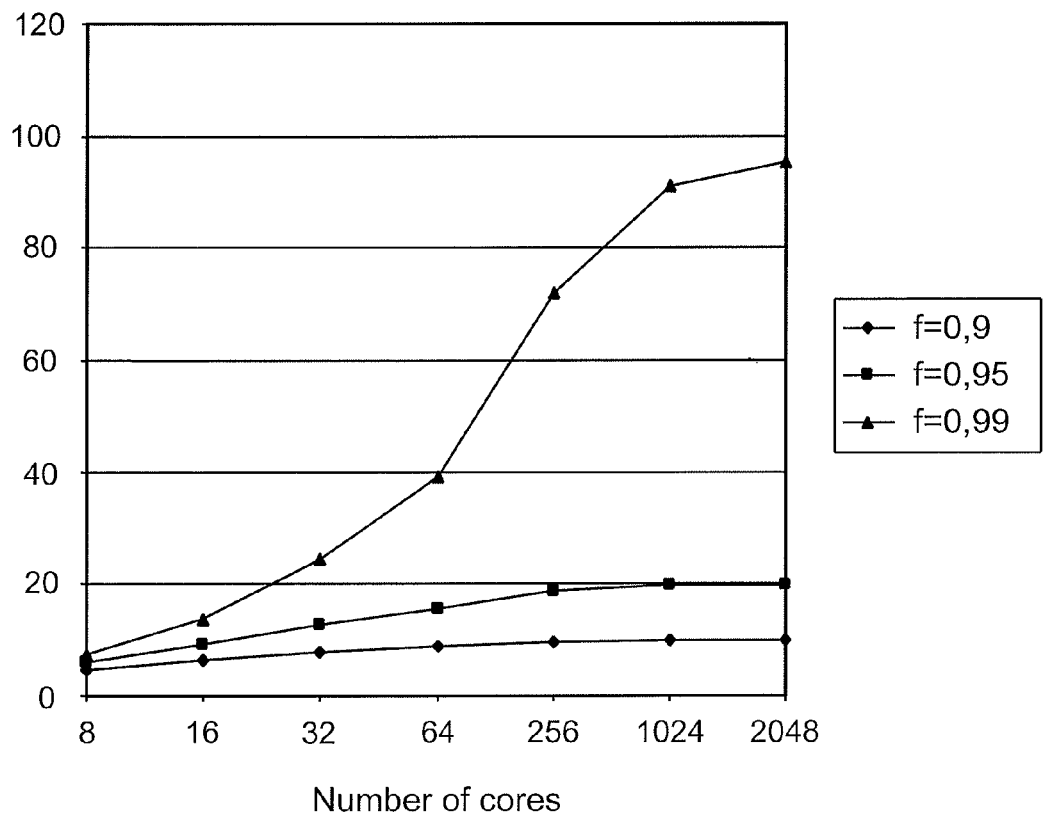
FIG. 1 is a diagram illustrating Speed-up according to Amdahl's law.
Figure 2:
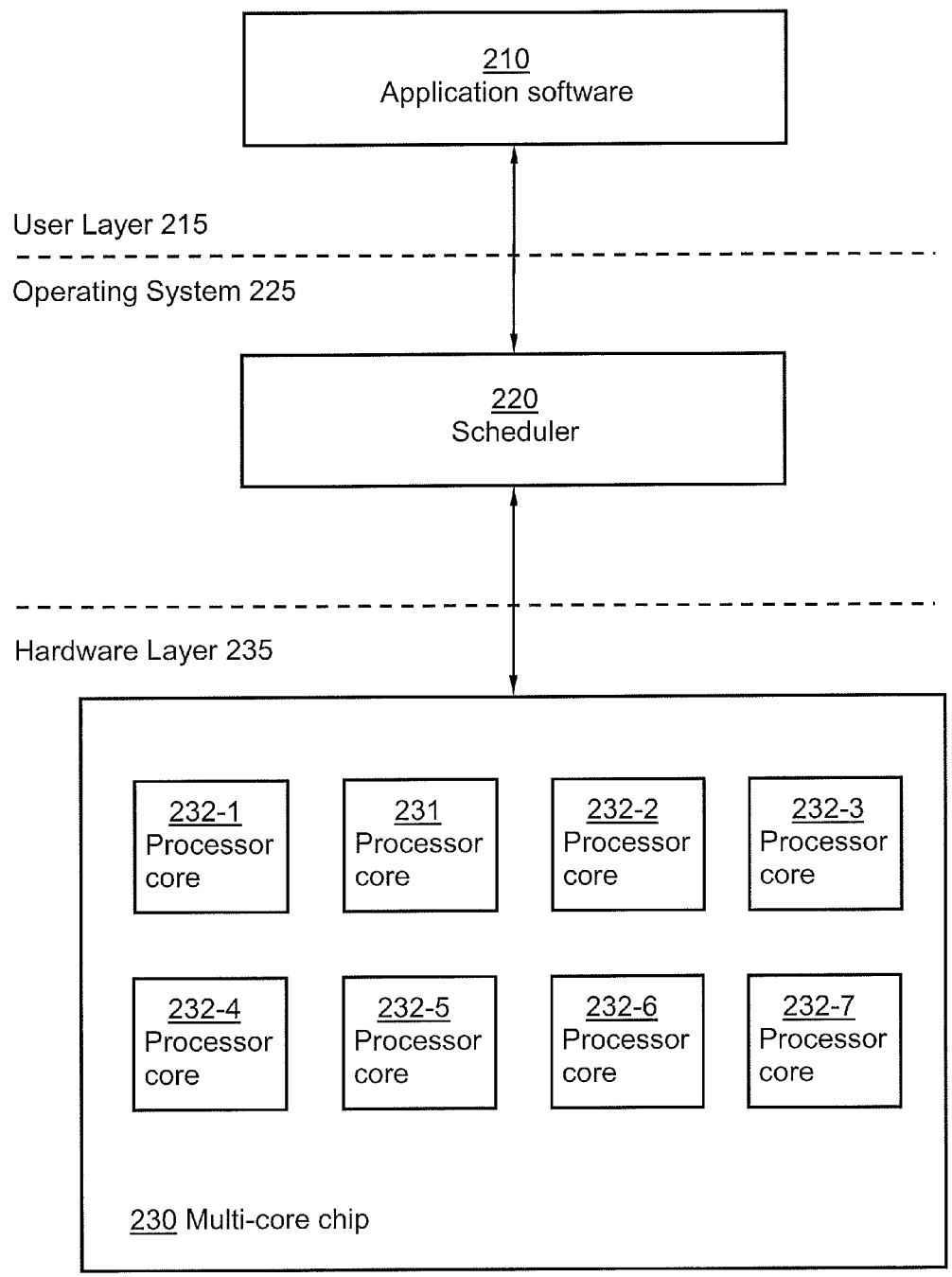
FIG. 2 is a schematic block diagram illustrating a system according to some embodiments.

FIG. 2 is a schematic illustration over a computer system 200. The computer system 200 may be situated within a computing device.

The computer system 200 comprises a user layer 215. An application software 210, within the user layer 215, may run in the computer system 200.

The computer system 200 further comprises an operating system 225 and a hardware layer 235.

The operating system 225 comprises a scheduler 220. The scheduler 220 is configured to schedule processing resources.

The hardware layer 235 may comprise a multi-core chip 230. The multi-core chip 230, which may be referred to as a multi-core processor, comprises a plurality of processor cores 231 and 232 although the cores 231, 232 in the multi-core chip 230 may vary in number in other embodiments. The processor cores 231 and 232 may further comprise further resources e.g. a cache memory, instruction processing engine, just to mention some arbitrary examples of core resources.

In the table below is summarized the expected speed-up as well as the suggested levels according to some embodiments. Even for 2048 core systems 200, five frequency levels (0, 1x, 2x, 4x, 8x) may suffice, with an acceptable impact on the theoretical performance. The performance differences are in the range of 1%-25% for applications with degrees of parallelism between 0.5 and 0.999, higher for applications with less degree of parallelism. However, all cores 231, 231, scalable or not, shall support at least levels 0 and 1x, i.e. it may be possible to switch off any core 231, 232.

| Number of cores | Theoretical speed-up | Suggested factor |
|---|---|---|
| 8 | 2 | 2 |
| 16 | 2.6 | 2 |
| 32 | 3.2 | 2 |
| 64 | 4 | 4 |
| 256 | 6.4 | 4 |
| 1024 | 10.1 | 8 |
| 2048 | 12.7 | 8 |

Embodiments of the present invention are thus based on the concept of a space-shared operating system 225, whereas the operating system 225 executes as service on some of the cores 231, while other cores 232 execute just a microkernel without threading support. Cores 231, 232 may further be allocated to applications 210 upon request. The total power the many-core chip may use to execute applications 210 is managed by the operating system 225. This global resource is allocated to applications 210 through two resources; cores 231, 232 and frequencies at which these cores 231, 232 execute, i.e. each application may be allocated a number of processor cores 231, 232, but the total computing power of these allocated number of processor cores 231, 232, i.e. the frequency at which these will execute, may be adjusted based on application needs and competing resource requests, within the limits set by the amount of scalable cores allocated to an application 210, the maximum frequency scaling factor that may be used for those cores 231, 232 and the total power budget of the chip 230.

In order to allow the scheduler 220 to allocate computing resources, each application 210 may provide the operating system 225 with three parallelism parameters. The first parameter is degree of parallelism. The degree of parallelism may be expressed as a fraction of the computation that may execute in parallel on multiple cores 231, 232. The second parameter is the minimum amount of cores 231, 232 that the application 210 needs in order to execute. The third parameter is the priority level of the application 210, which may appear quite similar to "process priority", as previously known.

Thus each application 210 may request two types of computing resources from the operating system 225. The first type of resource is processor core resource, which may be of type non-scalable, i.e. fixed frequency, or scalable i.e. scalable frequency. In the herein described non-limiting exemplary embodiments, the cores 231 are scalable and the cores 232 non-scalable. The allocation of this type of resource can occur at any time, e.g. at application start-up based on the parallelism parameters and/or during execution based on workload changes.

The second type of resource is execution speed. There are two scenarios for an application 210 to request allocation/deallocation of such resources. Temporary frequency boost/restore to normal for the scalable cores 231 allocated to it, or shut off/restore to normal for any core 231, 232 allocated to the application 210.

From application perspective, the present method may assume a behaviour similar to handling memory today. Thus the application 210 may specify its parallelism parameters at start-up according to some embodiments. Also, the application 210 may request shutting off cores 231, 232 immediately when these are not needed, e.g. once a parallel computation has finished and a single-threaded sequence begins. Further, according to some embodiments, the application 210 may request frequency boosting as a resource allocation request. The application 210 may according to some embodiments be responsible for requesting restoring to normal operating frequency of any core 231, 232 that was previously shut down. Further yet, the application 210 may be responsible for requesting allocation/release of processor cores 231, 232 of various types i.e. scalable/non-scalable.

According to some embodiments, the application 210 may be responsible to decide on which processor core 231, 232 a certain computation is to be executed, which requires a shift from today's approach where the application 210 just provides a set of threads that the operating system 225 will deploy on available resources The present method is based on the following principal idea of having the processor cores 231, 232 on the chip 230 space-shared rather than time-shared. Thus each processor core 231, 232 may be allocated to one and only one application 210. Also, the allocation of processor cores 231, 232 may be geometry aware, in the sense that the operating system 225 may group resources allocated to the same application 210 close to each other. Further, the operating system 225 may only shut off or free up allocated processor cores 231, 232 at the explicit request of the application 210 or when the application 210 exits. According to yet some embodiments, the operating system 225 may adjust the speed of individual scalable cores 231 if needed to accommodate new requests. All non-allocated cores 232 may be kept in shut-off state. Further yet, the processing resource requests may have a wait time attached, such that a request with a zero wait time may return immediately, either with allocated resources or a negative response. A request with a positive wait-time may either return immediately with successfully allocated resources or be queued by the operating system 225 until it can be fulfilled, or a timer expires.

The present method according to some embodiments may begin with shutting off all cores 231, 232 that do not execute operating system code. When a new application 210 is started, it gets allocated, if possible, the amount of processor cores 231, 232 that it has specified in its parallelism parameters. Initially, all cores 231, 232 may be started at normal, 1x speed. Allocation of processor cores 231, 232 may be possible if the current power usage and the power required by the cores 231, 232 according to the application parallelism parameters is less than, or equal to, the total power budget, or the application 210 has a priority level that triggers re-scheduling of power budgets and the re-scheduling results in having enough power budget freed up.

When an application 210 requests the allocation of more processor cores 231, 232, the request may be fulfilled if the resulting power budget does not exceeds the total budget, or the application 210 has a priority level that triggers re-scheduling of power budgets and the re-scheduling results in having enough power budget freed up.

The operating system 225 actively re-calculates power budgets every time a application 210 requests shut off or restore of individual cores 231, 232 and may process pending requests if possible. Restoring may only succeed if the resulting power budget does not exceeds the total budget, or the application 210 has a priority level that triggers re-scheduling of power budgets and the re-scheduling results in having enough power budget freed up.

Restoring of operation of already allocated cores operating system 225 may have higher priority than allocation of new resources according to some embodiments.

When an application 210 requests frequency boosting or restoring for a core 231, 232, the operating system 225 may fulfil the request if and to the extent that the result does not mean exceeding the overall power budget of the processor chip. If the application 210 has a priority level that may trigger re-scheduling of power budgets, such a re-scheduling may be performed. If the request was to reduce frequency, the operating system 225 may process pending resource requests.

The operating system 225 may keep track of the period for which a scalable core 231 was running at boosted frequency; in order to avoid over-heating of the chip 230, the frequency may be scaled back after the pre-set maximum amount of time the core 231, 232 is allowed to run at such high frequencies. The scale-back may also trigger re-scheduling and servicing of outstanding requests. The scalable core 231 may be kept running at low frequency for a certain amount of time so as to allow a decrease in the temperature of the chip in order to avoid physical damage to the hardware, according to some embodiments. Thus a timer 550 may be used in order to prevent the scalable core 231 from increasing the frequency before a certain predetermined time interval has passed. According to some embodiments the timer 550 may be activated at the moment when the scalable core 231 decreases the frequency from an increased frequency to a working frequency. A comparison between the measured timer value and a predetermined time limit may then be performed, such that the scalable core 231 is prevented from increasing the frequency before a certain predetermined cooling period has passed, according to some embodiments.

Re-scheduling of resource allocations may be regarded as an advantageous component of the present method. It may occur every time when a request cannot be fulfilled without over-stepping the power budget and the requesting application has a higher priority than at least some of the other executing applications 210.

During re-scheduling, the operating system 225 may basically modify the clocking of frequency-boosted cores 231, 232. As stated before, an already allocated core 231, 232 may not be taken away forcefully by the operating system 225, neither may it be shut down. This may be a pre-requisite to allow applications 210 to perform correctly. However, modifying the frequency at which single-threaded portions of lower-prioritized applications execute is a sensible way of prioritizing applications, without starving any. Hence, the operating system 225 may calculate how much the frequency scaling factor of some of the scalable cores executing lower-prioritized applications is to be reduced in order to fit in the power budget the requirements of higher prioritized applications. The applications 210 may be notified about the change and the application 210 with higher priority get its resources allocated.

There may be several different policies used by the scheduler 220 such as spreading the scale-back as evenly as possible to several applications 210, reducing the impact on each individual application 210, but impacting several applications 210. Also, the scheduler 220 may focus on just enough applications 210, the ones with the lowest priority, to free up sufficient amount of power budget to fulfil the request.

Requests with non-zero wait time that cannot be fulfilled may be queued and may be serviced based on the priority of the application 210 making the request. If a request cannot be fulfilled before its timer expires, the request may be rejected and the application 210 notified.

In the space-shared operating system 225, the scheduling method outlined above may be implemented as two components, placed in the core-local micro-kernel and a central resource management service.

The core-local micro-kernel has the primary task of managing the hardware and interfacing the application 210 and the central resource management service. It provides e.g. the following services: Change the frequency of the core 231, 232, shut down the core 231, 232, receive and forward to the central resource management service requests from the application 210.

In order to increase performance, replies from the central resource management service may be sent directly to the application 210, bypassing the local micro-kernel, according to some embodiments.

The central resource management service may be responsible for keeping track of all the processing resources i.e. scalable cores 231 and non-scalable cores 232 and the overall power budget. It has the function of allocating processing resources to newly started applications 210, re-calculating core frequencies and request adjustment from local micro-kernels, wake-up/shut-down cores 231, 232 and managing and tracking pending resource requests.

The central resource management service itself may be implemented as an internally distributed service, i.e. executing on multiple cores 231, 232. "Central" in this context only means that there may be one such service running in the system, visible to the distributed micro-kernels.

The present scheduling method thus may handle two types of resources: non-scalable cores 232 and scalable-cores 231. Both of these resources scale, quantity-wise, linearly with the total number of cores 231, 232. In fact, the maximum number of scalable cores 231 equals n/8, while the maximum number of non-scalable cores 232 may be, obviously, less than n, where n is the total number of processor cores 231, 232 in the chip 230.

The present scheduling method may perform two tasks: keeping track of allocated cores 231, 232 i.e. which core 231, 232 to which application 210, and performing re-scheduling calculations.

The first task may complexity-wise be quite similar to memory management and there are algorithms with a constant complexity, not dependent upon the actual number of resources or users, i.e. number of cores 231, 232 and amount of applications 210.

The task of re-scheduling may depend on the number of scalable cores 231, 232, limited to n/8 according to some embodiments. In fact, when a re-scheduling is to be performed, the scheduler may perform the following two steps:

Step 1

Identify the number of scalable cores 231 that are candidate for scaling back. These are cores 231 allocated to applications 210 with priority lower than the application 210 issuing the request that triggered the re-scheduling. As this information may be stored for each active scalable core 231, which may be limited to max n/8, according to some embodiments, this information may be obtained by traversing a list with n/8 elements, yielding a complexity of $O(n/8)$.

Step 2

Out of the candidate scalable cores 231, the method may select which core 231 have their frequency reduced and by how much. The gain with each frequency-step can be pre-calculated, hence the total number of frequency changes may be calculated as a simple calculation, which may be independent of the total number of cores 231, 232, but dependent on the chosen policy; in any case it will be limited to the number of scalable cores, hence $O(n/8)$.

In conclusion, the complexity of the re-scheduling algorithm may be $O(n/8)$ in best case, with a worst case complexity of $O(n/4)$. The key point is though that it scales linearly with the potential number of scalable cores and involves, even for a 1024 core chip, working with tables of at most 128 elements.

Concerning memory, the scheduler may have to store only four pieces of information for each scalable core 231, to which application 210 it is allocated, current frequency scaling factor, dead-line until it can execute at this frequency and application priority, for performance reasons, the amount of memory needed for even a 1024 core system may be just a few kilobytes. For each non-scalable cores information such as current state i.e. on/off and application information needs to be stored, adding a few extra kilobytes. Even on a 64 bit machine, the amount of memory required would be $n/8*3*8+n*8$, i.e. $11*n$ bytes, about 11 kilobytes for a 1024 core chip.

Figure 3:
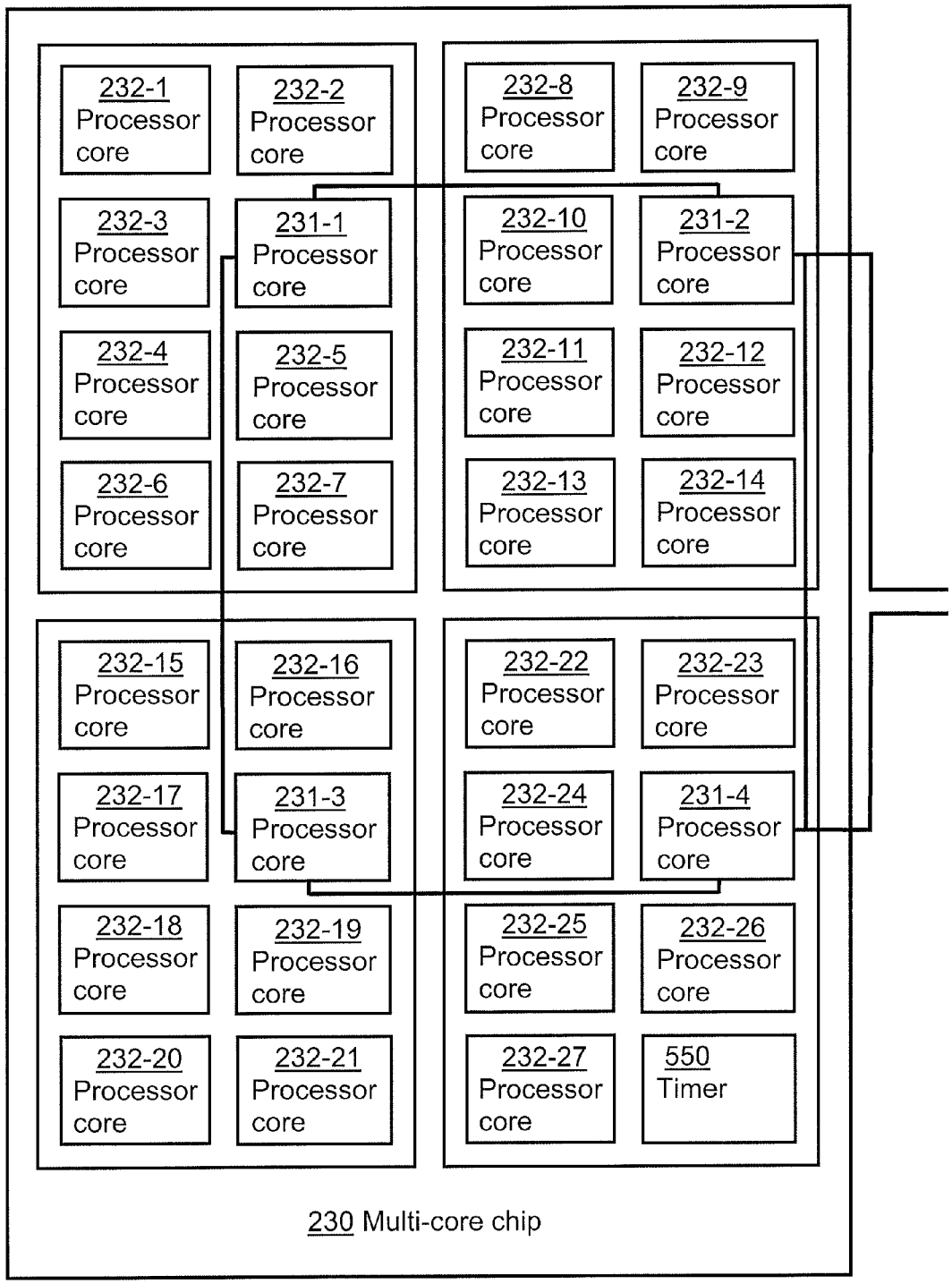
FIG. 3 is a schematic block diagram illustrating a Multi-core chip according to some embodiments.

FIG. 3 illustrates a multi-core chip 230 according to some embodiments.

An aspect to be considered may be the geometry of the multi-core chip 230. This may be an advantage primarily in order to avoid hot spots and over-heating of the multi-core chip 230, thus the processor cores 231 that can execute at higher frequencies may be spread out as evenly as possible and surrounded by other processor cores 232, running at lower frequencies. According to some optional embodiments, a hierarchical chip interconnect may be built, by connecting the scalable cores 231 with a high-speed interconnect and then connect groups of other cores 232 to each scalable core 231. A possible solution, out of a plurality of possible solutions for a 32 core chip according to some embodiments is shown in FIG. 3. Each square represents a non scalable core 232, and/or scalable cores 231, while the thick lines showing the high speed, top level interconnect.

Figure 4:
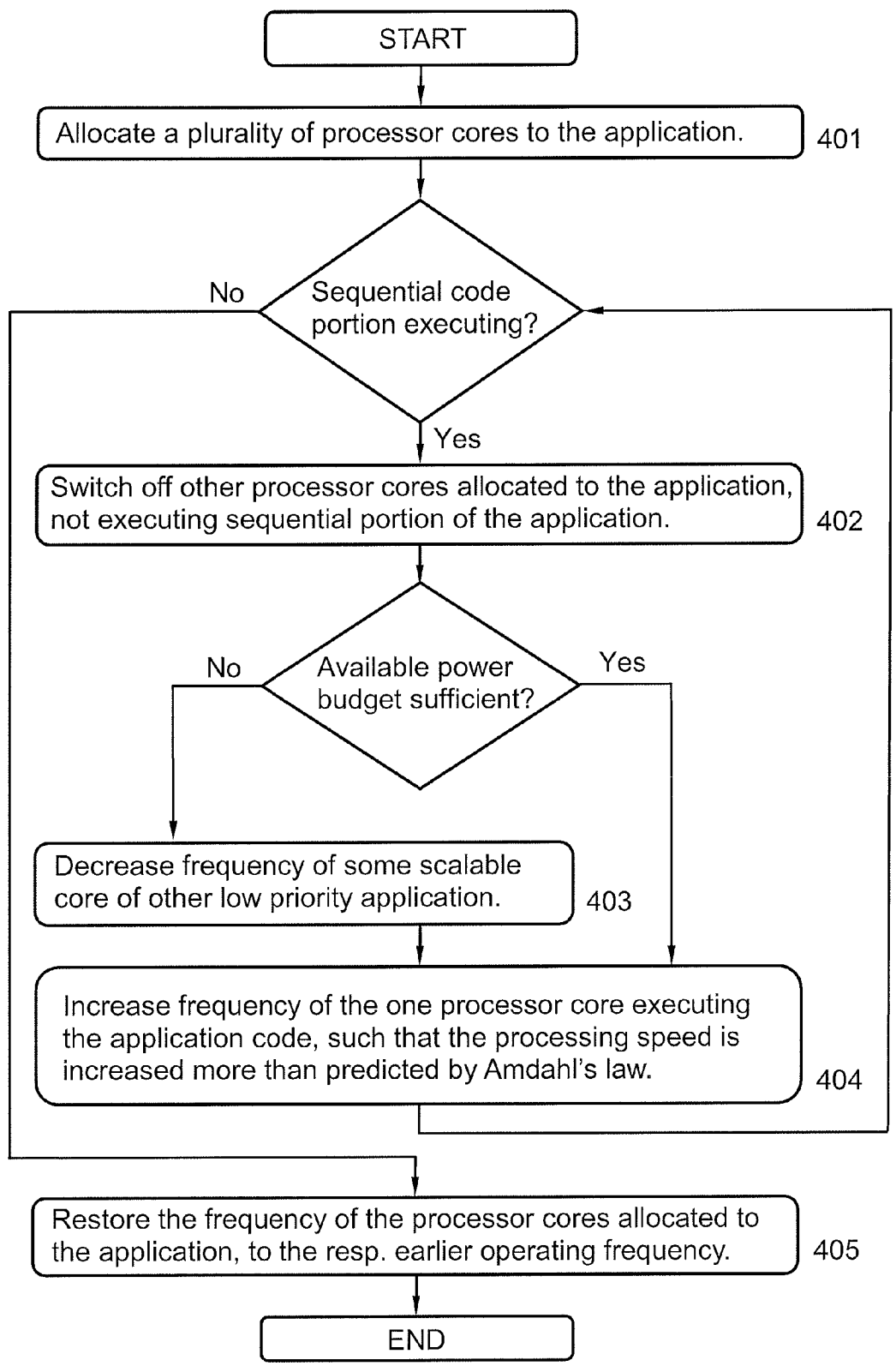
FIG. 4 is a flow chart illustrating embodiments of method steps in an operating system.

FIG. 4 is a flow chart illustrating embodiments of method steps 401-405 performed in an operating system 225. The method aims at scheduling processing resources on a multi-core chip 230. The multi-core chip 230 comprises a plurality of processor cores 231, 232. The operating system 225 is configured to schedule processing resources to an application 210 to be executed on the multi-core chip 230.

The multi-core chip 230 may comprise one or several processor cores 231 of a first type which may be adapted to operate on either a first operating frequency or at least one second frequency. Also, the multi-core chip 230 may comprise one or several processor cores 232 of a second type which are adapted to operate on either the first operating frequency or to be switched off, according to some embodiments.

The processor cores 231 of the first type may be referred to as scalable cores and the processor cores 232 of the second type may be referred to as non-scalable cores. The first operating frequency of the processor cores 231 of the first type and the first operating frequency of the processor cores 232 of the second type may be different, according to some embodiments. However, according to some embodiments, the first operating frequency may be the same for the processor cores 231 of the first type and the processor cores 232 of the second type.

The processor cores 231 the first type which are adapted to operate on either a first operating frequency and at least one second frequency may be spread out over the multi-core chip 230 and surrounded by at least one processor core 232 of the second type which is adapted to operate on either the first operating frequency or to be switched off, such that hot spots on the multi-core chip 230 may be avoided.

All non-allocated processor cores 231, 232 comprised on the multi-core chip 230 may be kept in shut off state, according to some embodiments.

The operating system 225 may be configured to schedule processing resources to a plurality of applications 210 to be executed on the multi-core chip 230, according to some embodiments.

To appropriately schedule processing resources on a multi-core chip 230, the method may comprise a number of method steps 401-405.

It is however to be noted that some of the described method steps 401-405 are optional and only comprised within some embodiments. Further, it is to be noted that the method steps 401-405 may be performed in any arbitrary chronological order and that some of them, e.g. step 401 and step 403, or even all steps may be performed simultaneously or in an altered, arbitrarily rearranged, decomposed or even completely reversed chronological order. The method may comprise the following steps:

Step 401

A plurality of processor cores 231, 232 are allocated to the application 210.

The number of initial allocation of processor cores 231, 232 to the application 210 may be based on at least one application related parameter of: degree of parallelism, minimum amount of needed processor cores 231, 232 and/or priority level, according to some embodiments.

Step 402

When a sequential portion of the application 210 is executing on only one processor core 231, another processor core 232, allocated to the application 210, not executing the sequential portion of the application 210 is switched off.

Step 403

The frequency of some of scalable cores allocated to other applications with a lower priority than the application 210 is decreased. Thereby the frequency increase of the core 231 executing the application 210 is possible to perform, within the overall power budget of the system.

Step 404

The frequency of the one processor core 231 executing the application 210 is increased to a second frequency, such that the processing speed is increased more than predicted by Amdahl's law.

The frequency of one or several processor cores 231 may be increased to the second frequency, for the same application 210, or for multiple applications according to some embodiments.

The second frequency may be set to any of: 2, 4 or 8 times the first operating frequency, based on the total number of processor cores 231, 232 on the multi-core chip 230.

According to some embodiments, a timer 550 may be set to a predetermined time value and switching the frequency of the one processor core 231 back to the first operating frequency when the predetermined time has passed. Thus overheating and physical damage of the processor core 231 may be avoided.

The processor core 231 may according to some embodiments be prevented to re-increase the frequency before a predetermined cooling period has expired. The cooling period may be monitored e.g. by the timer 550. Thus the timer 550 may be set to a predetermined value at the moment of frequency decrease of the processor core 231 and a count down to zero may be initiated before the frequency of the processor core 231 is allowed to increase again, according to some embodiments. Alternatively, the timer 550 may be set to zero and start counting the time at the moment of frequency decrease of the processor core 231 and compared to a time threshold value. Thus the processor core 231 may be prevented to re-increase the frequency before the predetermined cooling period has passed. Thus overheating and physical damage of the processor core 231 may be avoided.

Further, the assumed total power consumption of the processor cores 231, 232 comprised on the multi-core chip 230 may be computed after the frequency increase and the frequency increase may be adjusted such that a predetermined total power consumption limit is not exceeded, according to some embodiments.

Step 405

This step is optional and may only be performed within some embodiments.

When the sequential portion of the application 210, which portion is executing on only one processor core 231, is terminated, the frequency of the processor cores 231, 232 allocated to the application 210 may be restored to the respective first operating frequency, i.e. the frequency that was used before performing the step of increasing 404 the frequency.

However, according to some embodiments, the frequency may be restored to the first operating frequency when a predetermined time has expired, measured by the timer 550.

Figure 5:
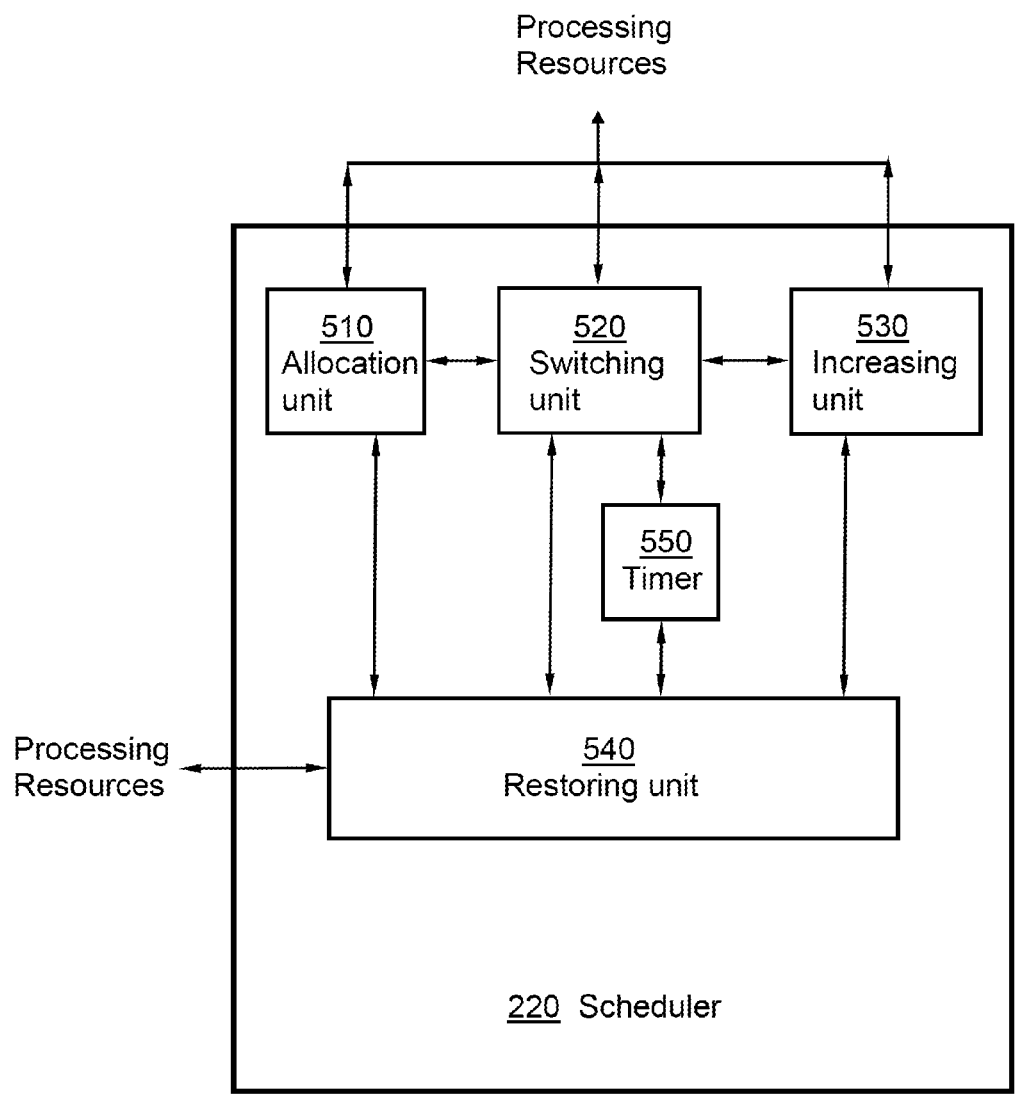
FIG. 5 is a block diagram illustrating embodiments of a scheduler in an operating system.
Figure 6:
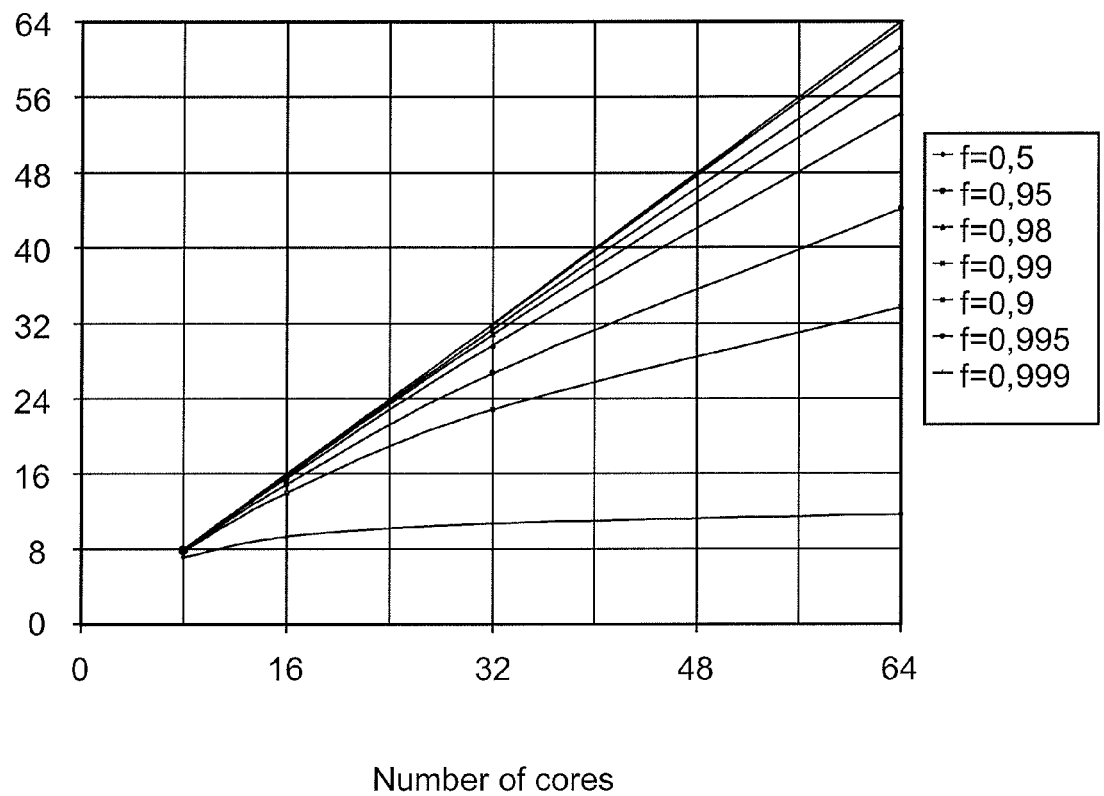
FIG. 6 is a diagram illustrating Speed-up according to some embodiments of the present method.

FIG. 5 is a block diagram illustrating embodiments of a scheduler 220 situated in an operating system 225. The scheduler 220 is configured to perform the method steps 401-405 for scheduling processing resources on a multi-core chip 230 to an application 210 to be executed on the multi-core chip 230. The multi-core chip 230 comprises a plurality of processor cores 231, 232.

For the sake of clarity, any internal electronics of the scheduler 220, not necessary for understanding the present solution has been omitted from FIG. 5.

The scheduler 220 comprises an allocation unit 510. The allocation unit 510 is adapted to allocate a plurality of processor cores 231, 232 to the application 210. Also, the scheduler 220 comprises a switching unit 520. The switching unit 520 is adapted to switch off a processor core 232 allocated to the application 210, not executing a sequential portion of the application 210. Further, the scheduler 220 comprises an increasing unit 530. The increasing unit 530 is adapted to increase the frequency of the one processor core 231 executing the application 210, such that the processing speed is increased more than predicted by Amdahl's law.

The scheduler 220 may further comprise a restoring unit 540. The optional restoring unit 540 is adapted to restore the frequency of the processor cores 231, 232 allocated to the application 210 when the sequential portion of the application 210, which portion is executing on only one processor core 231, is terminated.

According to some embodiments, the scheduler 220 may comprise a timer 550. The timer 550 may be set to a predetermined time value and switching the frequency of the one processor core 231 back to the first operating frequency when the predetermined time has passed.

The timer 550 may further be configured to monitor the cooling period of the processor core 231, such that the processor core 231 is prevented from re-increasing the frequency before a predetermined cooling period has expired.

It is to be noted that the described units 510-540 comprised within the scheduler 220 may be regarded as separate logical entities, but not with necessity as separate physical entities. Any, some or all of the units 510-540 may be comprised or co-arranged within the same physical unit. However, in order to facilitate the understanding of the functionality of the scheduler 220, the comprised units 510-540 are illustrated as separate units in FIG. 5.

A near linear increase in performance is achieved for even less parallelized applications, such as e.g. the speedup for f=0.5 is above 7 when using 8 processor cores 231, 232, but switching off all 256 processor cores 231, 232 when executing the sequential portion according to some embodiments of the present scheduling and resource management method.

Computer Program Product in the Operating System 225

The method steps 401-405 in the operating system 225 may be implemented through one or more processor cores 231, 232 in the multi-core chip 230, together with computer program code for performing the functions of the present method steps 401-405. Thus a computer program product, comprising instructions for performing the method steps 401-405 in the operating system 225 may schedule processing resources on a multi-core chip 230.

The computer program product mentioned above may be provided for instance in the form of a data carrier carrying computer program code for performing the method steps according to the present solution when being loaded into the processor core 231, 232. The data carrier may be e.g. a hard disk, a CD ROM disc, a memory stick, an optical storage device, a magnetic storage device or any other appropriate medium such as a disk or tape that can hold machine readable data. The computer program code may furthermore be provided as program code on a server and downloaded to the processor core 231, 232 remotely, e.g. over an Internet or an intranet connection.

The present invention may be embodied as a method and a scheduler in an operating system 225, and/or computer program products. Accordingly, the present invention may take the form of an entirely hardware embodiment, a software embodiment or an embodiment combining software and hardware aspects all generally referred to herein as a "circuit". Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices etc.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in an operating system for scheduling a plurality of processor cores on a multi-core chip to an application to be executed on the multi-core chip, the method comprises the steps of:
  allocating at least a portion of the plurality of processor cores to the application, wherein the plurality of processor cores comprises at least one core of a scalable type, which is adapted to be switched off and to be operable in any one of a plurality of frequencies, and at least one processor core of a non-scalable type, which is adapted to operate on only a first operating frequency and to be switched off,
  when a sequential portion of code of the application is executing on only one processor core of the scalable type:
  switching off at least one processor core of the non-scalable type allocated to the application but not executing the sequential portion of code of the application, and
  increasing the frequency of the one processor core of the scalable type executing the sequential portion of code of the application, such that the processing speed is increased more than predicted by Amdahl's law, and
  when the sequential portion of code of the application executing on only one processor core of the scalable type is terminated:
  restoring the frequency of the one processor core of the scalable type to the frequency performed before the step of increasing the frequency and switching back on the at least one processor core of the non-scalable type.

2. The method according to claim 1, wherein the frequency of the one core of the scalable type is increased for at least one other application executed on the multi-core chip.

3. The method according to claim 1, wherein the processor cores of the scalable type are spread out over the multi-core chip and surrounded by at least one processor core of the non-scalable type, such that hot spots on the multi-core chip are avoided.

4. The method according to claim 1, wherein the frequency is increased by a factor of any of two, four or eight times the first operating frequency, based on the total number of processor cores of the scalable and non-scalable type on the multi-core chip.

5. The method according to claim 1, wherein at least a portion of the plurality of processor cores are not allocated to the application and are kept in a shut off state.

6. The method according to claim 1, wherein a determination of how many processor cores of the scalable type and how many processor cores of the non-scalable type initially allocated to the application is made based on at least one of the following application related parameters: degree of parallelism, minimum amount of needed processor cores of the scalable and non-scalable type, or priority level.

7. The method according to claim 1, wherein the step of increasing the frequency of the one processor core of the scalable type executing the application comprises setting a timer to a predetermined time value and switching the frequency of the one processor core of the scalable type back to the first operating frequency when the predetermined time has passed, such that overheating and physical damage of the processor core of the scalable type is avoided.

8. The method according to claim 1, wherein the step of increasing the frequency of the one processor core of the scalable type executing the application comprises computing the assumed total power consumption of the processor cores of the scalable and non-scalable type comprised on the multi-core chip, after the frequency increase and adjust the frequency increase such that a predetermined total power consumption limit is not exceeded.

9. The method according to claim 1, wherein the operating system is configured to schedule processor cores to a plurality of applications to be executed on the multi-core chip.

10. The method according to claim 1, wherein the method comprises the further step of:
  decreasing the frequency of some of scalable cores allocated to other applications with a lower priority than the application, such that the frequency increase of the processor core of the scalable type executing the application is possible to perform within the overall power budget of the system.

11. The method according to claim 1, wherein the processor core of the scalable type is prevented to re-increase the frequency before a predetermined cooling period has expired.

12. A computer system comprising:
- a multi-core chip comprising a plurality of processor cores, wherein the plurality of processor cores comprises at least one core of a scalable type, which is adapted to be switched off and to be operable in any one of a plurality of frequencies, and at least one processor core of a non-scalable type, which is adapted to operate on only a first operating frequency and to be switched off;
- memory containing instructions that, when executed by at least one of the processor cores, cause the computer system to implement a scheduler in an operating system for scheduling the plurality of processor cores to an application to be executed on the multi-core chip, the scheduler comprising:
- an allocation unit, adapted to allocate at least a portion of the plurality of processor cores to the application,
- a switching unit, adapted to switch off one of the plurality of processor cores allocated to the application, not executing a sequential portion of code of the application,
- an increasing unit for increasing the frequency of the one or several processor cores executing the sequential portion of code of the application such that the processing speed is increased more than predicted by Amdahl's law, and
- a restoring unit for restoring the frequency of the one or several processor cores to the frequency performed before the increasing of the frequency and for switching back on the processor core when execution of the sequential portion of code of the application is terminated.

\* \* \* \* \*